(12) United States Patent
Bakulich, Jr.

(10) Patent No.: US 6,183,385 B1
(45) Date of Patent: Feb. 6, 2001

(54) VARIABLE-RATIO TRANSMISSION

(76) Inventor: Frank Vincent Bakulich, Jr., 2801 Ocean Park Blvd. #206, Santa Monica, CA (US) 90405

( * ) Notice: Under 35 U.S.C. 154(b), the term of this patent shall be extended for 0 days.

(21) Appl. No.: 09/345,396

(22) Filed: Jul. 1, 1999

(51) Int. Cl.[7] ............... F16H 59/00; F16H 61/00; F16H 63/00; F16H 9/02
(52) U.S. Cl. .................................................. 474/49
(58) Field of Search ............................... 474/49

(56) References Cited

U.S. PATENT DOCUMENTS

| | | |
|---|---|---|
| 4,740,190 * | 4/1988 | Pike ............................... 474/49 |
| 4,874,351 | 10/1989 | Jackson . |
| 5,104,357 | 4/1992 | Leonard et al. . |
| 5,290,206 | 3/1994 | Graham . |
| 5,476,422 | 12/1995 | Schendel . |

FOREIGN PATENT DOCUMENTS 55-86948 * 1/1980 (JP) ............................... 474/49

* cited by examiner

*Primary Examiner*—Dirk Wright
(74) *Attorney, Agent, or Firm*—Robert E. Malm

(57) ABSTRACT

The invention is a variable-ratio transmission comprising a base having an axis of rotation to which an object can be attached and a plurality of pulley assemblies slideably attached to the base along radials. Each pulley assembly comprises one or more pulleys, a pulley shaft, and a pulley transport. The pulleys of a pulley assembly are rotatably attached to the pulley shaft and are rotatable in only one direction about the pulley shaft. The pulley shaft is attached to the pulley transport. The pulley transport is slideably attached to the base along a radial. The pulley assemblies are so arranged that the plurality of pulleys can engage at least one encircling belt or chain. An actuating system applies radial forces to the plurality of pulley transports for the purpose of maintaining the pulley assemblies in fixed radial positions or moving the pulley assemblies to other radial positions. The actuating system is controlled by an external entity.

19 Claims, 4 Drawing Sheets

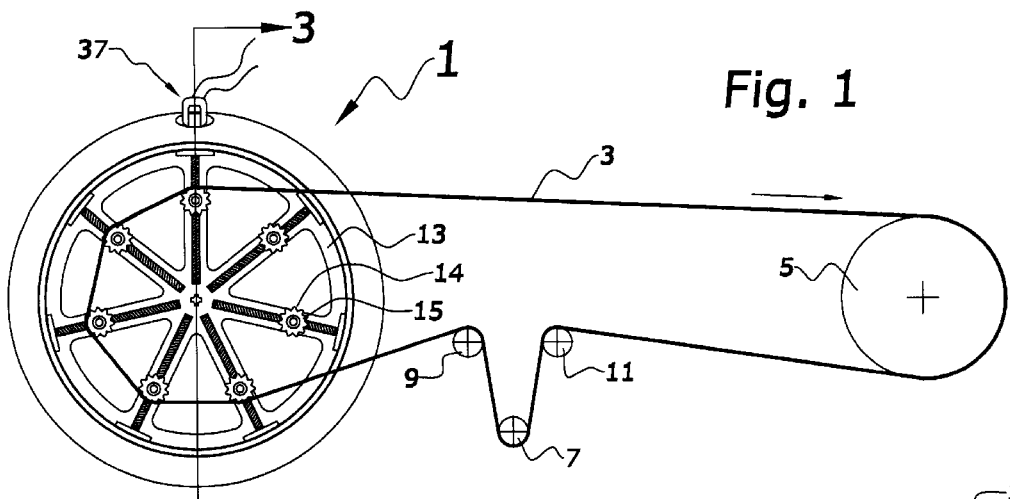
Fig. 1
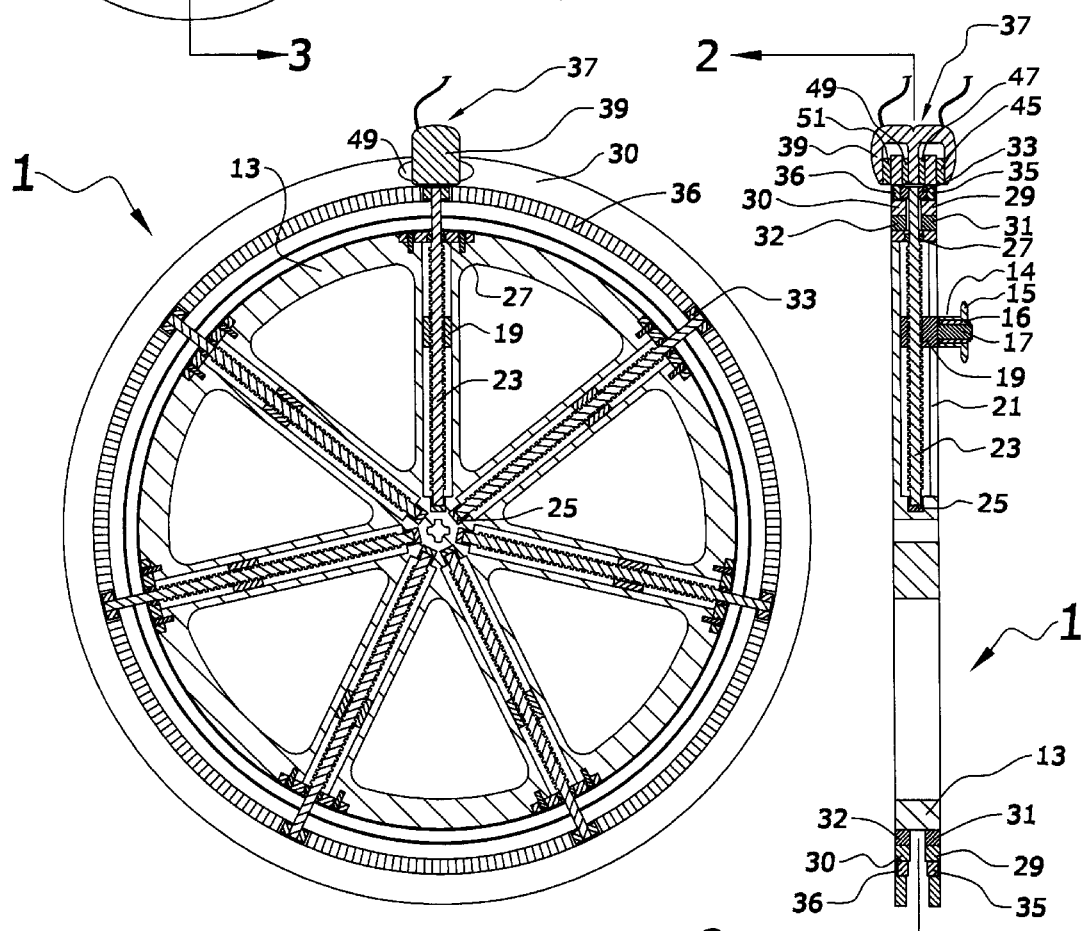
Fig. 2
Fig. 3

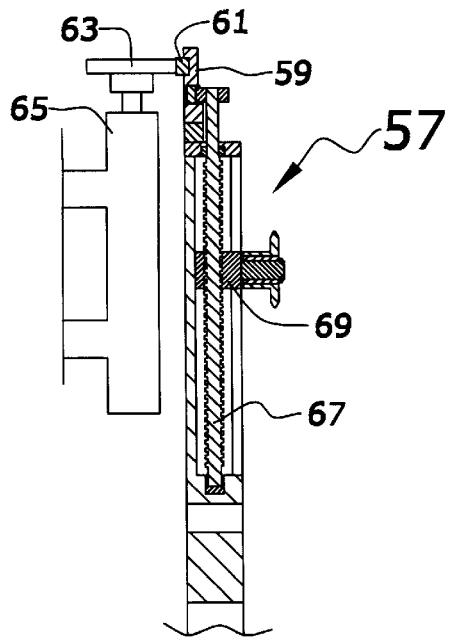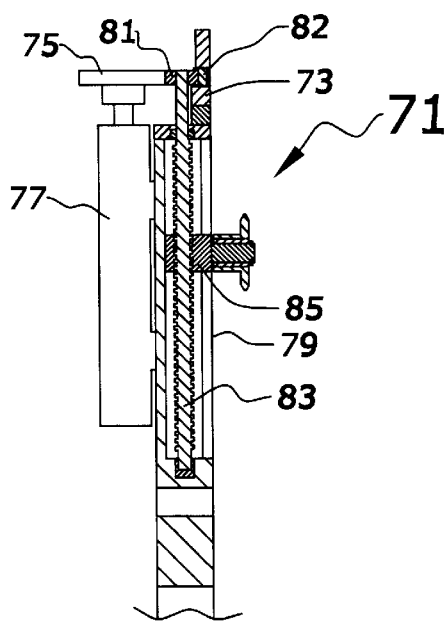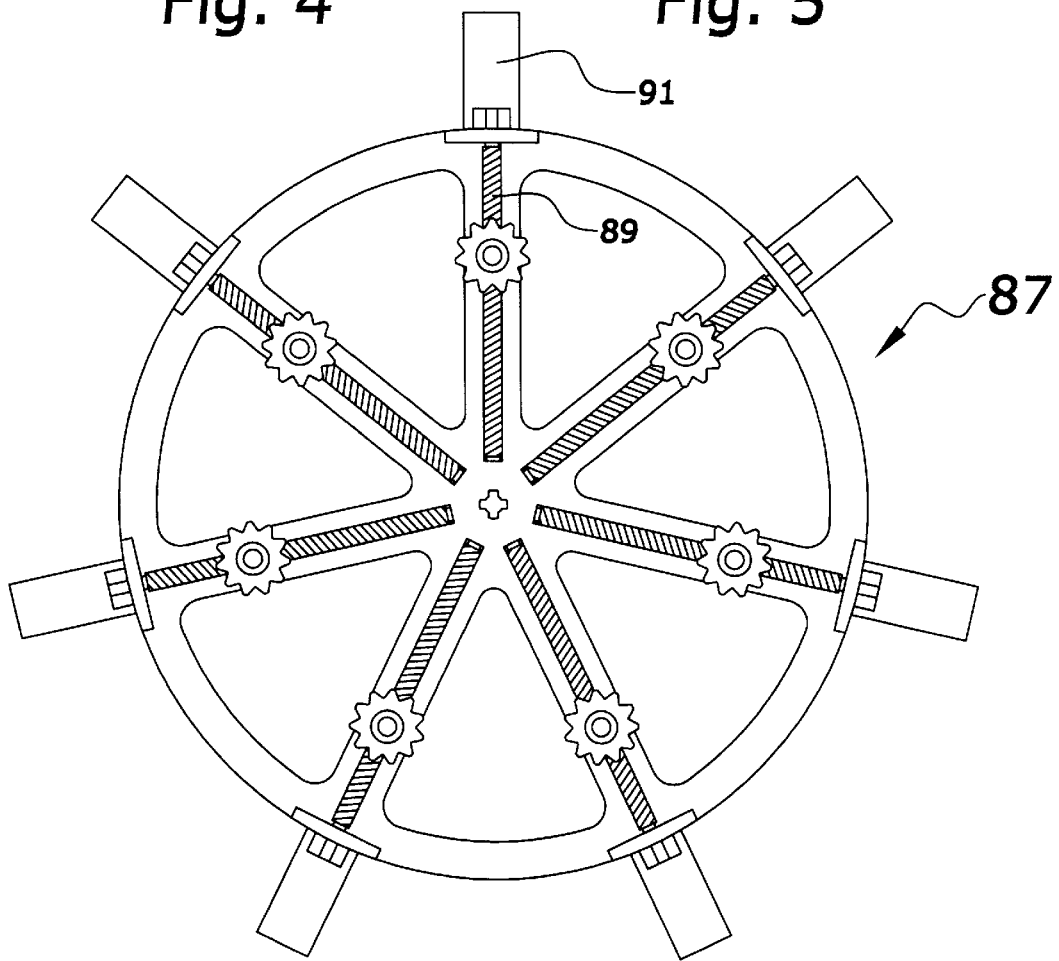

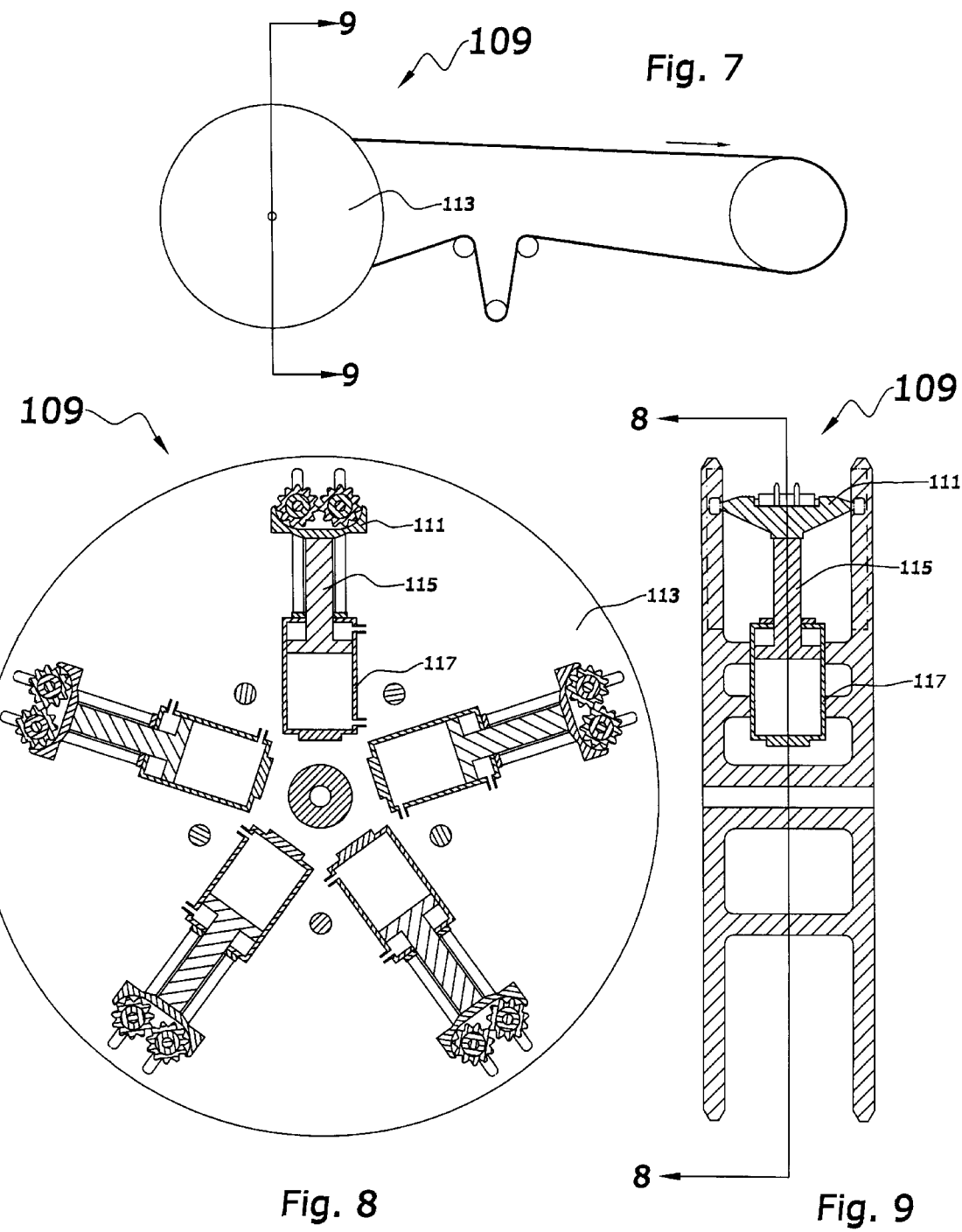

VARIABLE-RATIO TRANSMISSION

CROSS-REFERENCE TO RELATED APPLICATIONS

Not applicable.

STATEMENT REGARDING FEDERALLY SPONSORED RESEARCH AND DEVELOPMENT

Not applicable.

BACKGROUND OF THE INVENTION

This invention relates generally to variable-ratio belt-driven transmissions and more specificially to belt-driven transmissions for which the ratio of belt velocity to the angular velocity of the transmission output is continuously variable.

A belt-driven transmission converts power supplied by an endless belt to rotary power. It is desirable for many applications that the transmission ratio, the ratio of the linear velocity of the belt to the angular velocity of the transmission output, be not only variable but continuously variable.

Perhaps the oldest and simplest variable-ratio transmission is an assembly of pulleys of different diameters on a common hub. The transmission ratio is changed by shifting the belt from one pulley to another.

A variable-ratio transmission for use with V-belts consists of a pulley split into two halves with a means for varying the separation of the two halves. Since the cross section of the split-pulley belt channel is V-shaped to match the sides of the V-belt, the distance of the V-belt from the axis of rotation and the transmission ratio is proportional to the separation of the pulley halves. The split-pulley approach has the advantage of having a transmission ratio that is continuously variable. Unfortunately, the torque available from such a transmission is limited since the torque depends on the frictional force that maintains the V-belt in contact with the pulley.

In order to obtain higher torques, it is necessary to use corrugated belts and pulleys (or chains and sprockets) that provide positive, non-slip engagements. A transmission with a continuously-variable transmission ratio and based on the use of a corrugated belt and a matching corrugated pulley implies a pulley having a continuously-variable diameter and a constant rib pitch. Such a pulley tends to be very complex. A need exists for a simple continuously-variable transmission that is suitable for high-torque applications.

BRIEF SUMMARY OF THE INVENTION

The invention is a variable-ratio transmission comprising a base having an axis of rotation to which an object can be attached and a plurality of pulley assemblies slideably attached to the base along radials. Each pulley assembly comprises one or more pulleys, a pulley shaft, and a pulley transport. The pulleys of a pulley assembly are rotatably attached to the pulley shaft and are rotatable in only one direction about the pulley shaft. The pulley shaft is attached to the pulley transport. The pulley transport is slideably attached to the base along a radial. The pulley assemblies are so arranged that the plurality of pulleys can engage at least one encircling belt or chain. An actuating system applies radial forces to the plurality of pulley transports for the purpose of maintaining the pulley assemblies in fixed radial positions or moving the pulley assemblies to other radial positions. The actuating system is controlled by an external entity.

BRIEF DESCRIPTION OF THE DRAWINGS

FIG. 1 shows an embodiment of the variable-ratio transmission connected by a belt to a pulley.

FIG. 2 is a sectional view of the embodiment of the variable-ratio transmission shown in FIG. 1 taken upon a plane parallel to the page.

FIG. 3 is a sectional view of the embodiment of the variable-ratio transmission shown in FIG. 1 taken upon a plane perpendicular to the page.

FIG. 4 shows an embodiment of the variable-ratio transmission wherein all threaded rods are driven synchronously by a motor attached to a support structure and operating through a gear ring.

FIG. 5 shows an embodiment of the variable-ratio transmission wherein all threaded rods are driven synchronously by a motor attached to a base and operating through a pinion attached to a threaded rod and a gear ring.

FIG. 6 shows an embodiment of the variable-ratio transmission wherein the threaded rods are driven individually by motors.

FIG. 7 shows an embodiment of the variable-ratio transmission utilizing hydraulic control.

FIG. 8 is a plan view of an embodiment of the variable-ratio transmission wherein the pulley transports are positioned by a hydraulic system.

FIG. 9 is a side view of the embodiment shown in FIG. 8.

DETAILED DESCRIPTION OF THE INVENTION

Figure 10:
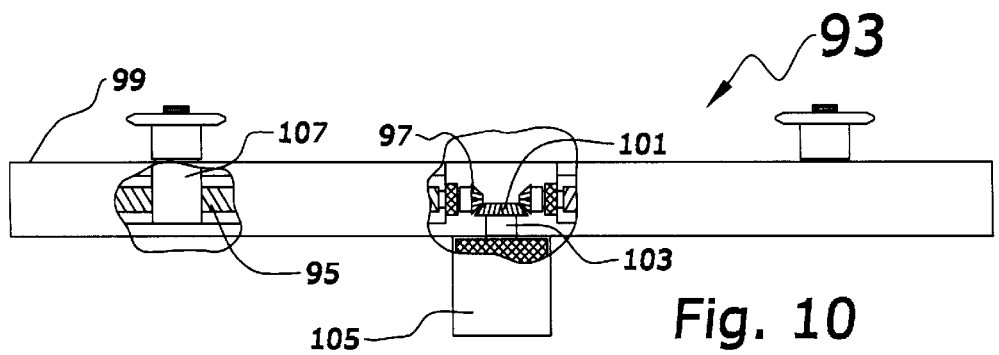
FIG. 10 shows an embodiment of the variable-ratio transmission without gear rings.

An embodiment 1 of the variable-ratio transmission is shown in FIG. 1 linked by means of a belt (or chain) 3 to a pulley 5. A spring-loaded pulley 7 in combination with fixed pulleys 9 and 11 maintains the belt 3 in tension. The variable-ratio transmission embodiment shown in FIG. 1 consists of a base 13 having an axis of rotation out of the page and a plurality of pulley assemblies 14 that are slideably attached to the base 13 along radials and carry pulleys 15. The pulleys 15 are allowed to rotate in only one direction. If the base 13 is rotating clockwise, the pulleys 15 may only rotate counterclockwise.

By sliding the pulleys 15 in synchronism either away from or toward the axis of rotation, one can obtain a variable ratio of belt velocity to angular velocity of the base. The belt 3 remains continuously meshed with those pulleys 15 with which it comes in contact. As the distance of the pulleys 15 from the axis of rotation changes, the distance spanned by the belt between adjacent pulleys with which the belt meshes must also change. This change in the distance spanned by the belt is accommodated by the pulleys 15 being allowed to rotate in a direction counter to the direction of rotation of the base 13.

For the direction of belt travel shown in FIG. 1, the pulley 5 is driving the variable-rate transmission embodiment 1. The variable-ratio transmission may also be the driving member in the system by interchanging the positions of the variable-ratio transmission 1 and the pulley 5.

The details of construction of a first embodiment 1 of the variable-ratio transmission is shown in the sectional views of FIGS. 2 and 3. A pulley assembly 14 consists of a pulley 15 attached to a one-direction-rotatable bearing 16 which in turn is attached to a pulley shaft 17. The pulley shaft 17 is attached to a pulley transport 19 which slides radially within a channel 21. The pulley transports 19 are caused to travel radially by rotatable threaded rods 23 which are screwed through threaded holes in the pulley transports 19. The rotatable threaded rods 23 are held in place radially by bearings 25 and 27. As the threaded rods 23 rotate, the pulley transports 19 move either away from or toward the axis of rotation, depending on the direction of rotation of the threaded rods 23.

The rotation of the threaded rods 23 in synchronism is accomplished by either gear ring 29 or gear ring 30 which are rotatably attached to base 13 by means of bearings 31, 32. Pinions 33 attached to the ends of the threaded rods 23 mesh with the gear teeth 35, 36 of the gear rings 29, 31. If the rotation of one of the gear rings 29, 30 is slowed or stopped relative to base 13 by hydraulic brake 37, the other of the gear rings being unconstrained in its rotation, the pinions 33 rotate thereby causing the pulley transports 19 to move radially in synchronism.

The hydraulic brake 37 is attached to the support structure for the transmission 1. The hydraulic brake 37 consists of a piston-activated caliper assembly 39 that sandwiches portions of gear rings 29, 31 between brake pads 45, 47 and brake pads 49, 51. When one of the pistons is activated, opposing forces are applied to brake pads 45, 47 causing the rotation of gear ring 29 to slow or stop. When the other piston is activated, opposing forces are applied to brake pads 49, 51 causing the rotation of gear ring 30 to slow or stop. One may use other types of brakes wherein the stopping force is provided by, for example, compressed air, a cable under tension, or a rod under compression.

A second embodiment 57 of the variable-ratio transmission shown in FIG. 4 has only one gear ring 59. The gear ring 59 has an additional ring of teeth 61 that mesh with pinion 63 attached via a slip clutch to the shaft of reversible motor 65 that is attached to the support structure for the transmission 57. The reversible motor 65 can rotate the threaded rods 67 in either direction thereby causing the pulley transports 69 to travel radially either toward or away from the axis of rotation.

A third embodiment 71 of the variable-ratio transmission shown in FIG. 5 also has only one gear ring 73. The pinion 75 attached to the shaft of reversible motor 77 that is attached to base 79 meshes with pinion 81 that is attached to one of the threaded rods 83. Pinion 81 meshes with the gear teeth 82 of gear ring 73. The reversible motor 77 operating through gear ring 73 can rotate the threaded rods 83 in either direction thereby causing the pulley transports 85 to travel radially either toward or away from the axis of rotation.

A fourth embodiment 87 of the variable-ratio transmission shown in FIG. 6 has no gear rings. The threaded rods 89 are driven directly by stepping motors 91 that are synchronized electronically.

The fifth embodiment of the variable-ratio transmission 109 shown in FIGS. 7, 8, and 9 substitutes a hydraulic system for the threaded rods used in the other embodiments. The pulley transports 111 are driven radially toward or away from the axis of rotation of the base 113 by hydraulically-driven pistons 115 in cylinders 117. By appropriate valving, a fluid under pressure enters one end of a cylinder 117 on one side of a piston 115 and the fluid on the other side of the piston 115 is permitted to exit the cylinder 117 at a much lower pressure. This difference in pressure causes the piston 115 and the pulley transport 111 to which it is connected to move either toward or away from the axis of rotation of the base 113, depending on the valving. The valving is so designed as to cause the pulley transports to move in synchronism.

A sixth embodiment 93 of the variable-ratio transmission shown in FIG. 10 also has no gear rings. The threaded rods 95 have attached bevel gears 97 at the ends nearest to the axis of rotation of the base 99. The bevel gears 97 mesh with bevel gear 101 that is attached to the shaft 103 of reversible motor 105. As the reversible motor 105 rotates, the threaded rods 95 rotate and the pulley transports 107 move either toward or away from the axis of rotation of the base 99.

Figure 11:
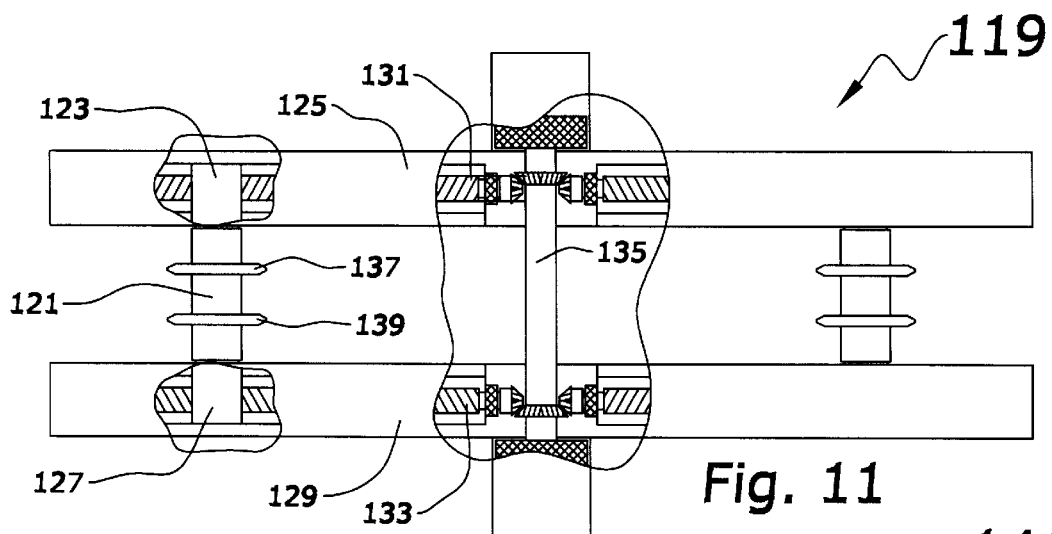
FIG. 11 shows an embodiment of the duo variable-ratio transmission.

It may be desirable in utilizing the variable-ratio transmission in high-torque applications to use a duo variable-ratio transmission. In the duo variable-ratio transmission embodiment 119 shown in FIG. 11, support for pulleys 121 is provided by pulley transports 123 slideably attached to base 125 and pulley transports 127 slideably attached to base 129. Synchronism of the pulley transports 123, 127 is accomplished by driving the threaded rods 131, 133 by a common shaft 135. The embodiment 119 of FIG. 11 also shows pulleys 121 consisting of two sprockets 137, 139 for accommodating two drive chains. The two chains may encircle the variable-ratio transmission in the same direction or in opposite directions. In the case of opposite directions, an additional pulley 5 (see FIG. 1) would be required on the left side of the variable transmission 1.

The belt or chain that engages the pulleys of a variable-ratio transmission can exert substantial radial forces under load on the pulley assemblies. Moving the pulley assemblies away from the axis of rotation is made more difficult by the existence of these forces. The embodiment 141 of the variable-ratio transmission shown in FIG. 12 includes springs 143 under compression in the pulley transport channels 145 and push against the pulley assemblies 147, thereby partially compensating for the forces applied by the belt or chain to the pulley assemblies.

Figure 12:
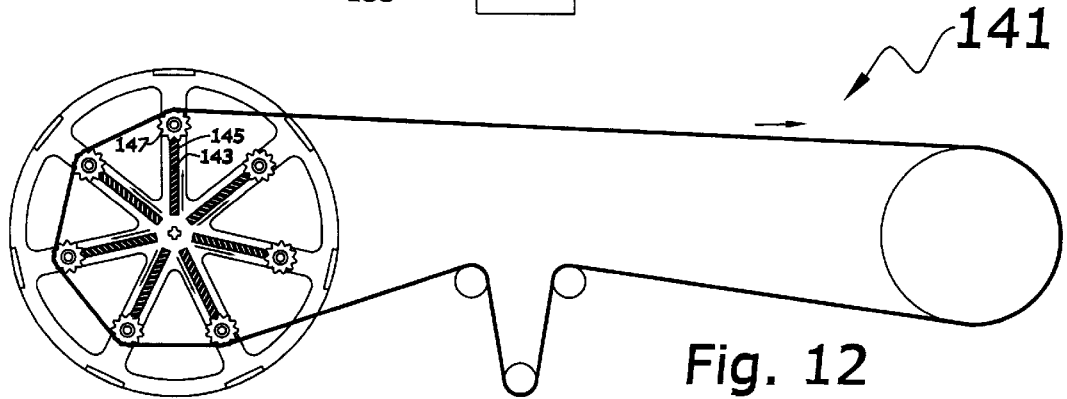
FIG. 12 shows an embodiment of the variable-ratio transmission wherein the forces exerted on the pulley transports by a belt are partially compensated by compressed springs.
Figure 13:
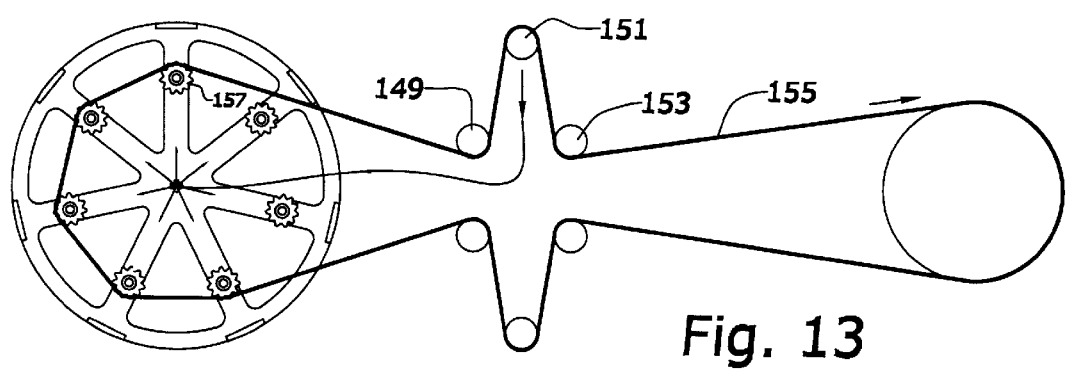
FIG. 13 shows an embodiment of the variable-ratio transmission wherein a measurement of belt tension controls the application of compensating forces to the pulley transports.

A more sophisticated approach to balancing the forces exerted by the belt or chain on the pulley transports of a variable-ratio transmission is shown in FIG. 12. Three pulleys 149, 151, 153 are placed in the region where the belt or chain 155 experiences high tension. The attachment of the pulley 151 to a support structure includes a force sensor that measures the force exerted on the pulley 151 by the belt or chain 155. This force measurement is used to control the forces applied to the pulley transports 157 (by, for example, a hydraulic system such as the one described in connection with FIGS. 8 and 9) to balance the forces applied by the belt or chain 155.

What is claimed is:
1. A transmission comprising:
a base to which an object can be attached, the base having an axis of rotation;
a plurality of pulley assemblies, each pulley assembly comprising one or more pulleys, a pulley shaft, and a pulley transport, the pulleys of a pulley assembly being rotatably attached to the pulley shaft, the pulleys being rotatable in only one direction about the pulley shaft, the pulley shaft being attached to the pulley transport, the pulley transport being slideably attached to the base along a radial, the pulley assemblies being so arranged that the plurality of pulleys can engage at least one encircling belt or chain;

an actuating system that applies radial forces to the plurality of pulley transports for the purpose of maintaining the pulley assemblies in fixed radial positions or moving the pulley assemblies to other radial positions, the actuating system being controlled by an external entity, the radial forces applied by the actuating system to move the pulley assemblies to other radial positions being applied continually to the plurality of pulley transports for as long as the external source is commanding movement of the plurality of pulley transports.

2. The transmission of claim 1 wherein the pulley shafts are cantilevered to the pulley transports.

3. The transmission of claim 1 wherein a pulley assembly consists of a first transport and a second transport separately slideably attached to the base, the first transport being attached to one end of the pulley shaft and the second transport being attached to the other end of the pulley shaft.

4. The transmission of claim 1 wherein the surface of a pulley that is intended to make contact with a belt or chain is corrugated, the surface being intended to mate with a similarly-corrugated belt or chain.

5. The transmission of claim 1 wherein the pulleys are sprockets.

6. The transmission of claim 1 wherein the actuating system comprises:

a plurality of threaded rods, each pulley transport having one or more threaded holes to receive one or more threaded rods;

a plurality of pinions, a pinion being attached to an end of each threaded rod;

one or more gear rings rotatably attached to the base and having the same axis of rotation as the base, each gear ring having one or more sets of gear teeth, one set of gear teeth belonging to one or more of the one or more gear rings meshing with the plurality of pinions;

a motion control mechanism that controls the rotation of the one or more gear rings, the motion control mechanism being controlled by an external entity.

7. The transmission of claim 6 wherein the motion control mechanism comprises:

a brake that exerts a force on one or more of the one or more gear rings in opposition to the motion of the one or more gear rings in response to an input by the external entity.

8. The transmission of claim 6 wherein the motion control mechanism comprises:

a motor having a pinion attached to the motor shaft, the motor shaft pinion meshing with the pinion attached to one of the threaded rods.

9. The transmission of claim 6 wherein the motion control mechanism comprises:

a motor having a pinion attached to the motor shaft, the motor-shaft pinion meshing with a set of gear teeth belonging to a gear ring.

10. The transmission of claim 1 wherein the actuating system comprises:

a control shaft having an axis of rotation coinciding with the axis of rotation of the base;

a plurality of threaded rods, each pulley transport having one or more threaded holes to receive one or more threaded rods;

a plurality of driven bevel gears, a driven bevel gear being attached to an end of each threaded rod;

one or more driving bevel gears attached to the control shaft, the driving bevel gears meshing with the driven bevel gears;

a motion control mechanism that controls the rotation of the control shaft, the motion control mechanism being controlled by an external entity.

11. The transmission of claim 10 wherein the motion control mechanism is the external entity.

12. The transmission of claim 10 wherein the motion control mechanism is a motor.

13. The transmission of claim 1 wherein the actuating system comprises:

a plurality of threaded rods, each pulley transport having one or more threaded holes to receive one or more threaded rods;

a motion control mechanism that controls the rotations of the threaded rods, the motion control mechanism being controlled by the external entity, the motion control mechanism not requiring the participation of any of the threaded rods in controlling the rotations of any of the other threaded rods.

14. The transmission of claim 13 wherein the motion control mechanism comprises:

a plurality of motors, the shaft of each motor being connected to a threaded rod.

15. The transmission of claim 1 wherein the actuating system comprises:

a hydraulic system wherein fluid pressure exerted on the pulley transports causes the radial position of the pulley transports to change.

16. The transmission of claim 1 further comprising:

a force compensation system that exerts forces on the pulley transports to compensate for the forces applied by an encircling belt or chain.

17. The transmission of claim 16 wherein the force compensation system comprises a spring associated with each pulley transport.

18. The transmission of claim 16 wherein the force compensation system comprises a fluid under pressure exerting a force on each pulley transport.

19. The transmission of claim 16 wherein the force compensation system comprises a sensor that measures the tension in a belt or chain that engages the pulleys.

* * * * *